United States Patent [19]

Adduci et al.

[11] 4,410,226

[45] Oct. 18, 1983

[54] JUNCTION BOX AND CONNECTOR ARRANGEMENT

[75] Inventors: Robert L. Adduci, Girard; Duane L. Abbuhl, Williamsfield, both of Ohio

[73] Assignee: General Motors Corporation, Detroit, Mich.

[21] Appl. No.: 291,560

[22] Filed: Aug. 10, 1981

[51] Int. Cl.$^3$ .............................................. H01R 4/28
[52] U.S. Cl. .............................. 339/44 R; 339/116 R; 339/198 J; 174/138 F
[58] Field of Search ................. 339/22, 116 R, 116 C, 339/198 R, 198 C, 198 E, 198 J, 206 R, 206 L, 206 P, 207 R, 207 S, 209, 36, 44 R; 174/138 F

[56] References Cited

U.S. PATENT DOCUMENTS

| | | | |
|---|---|---|---|
| 1,336,290 | 4/1920 | Finkelstein | 339/206 R |
| 1,915,199 | 6/1933 | Park | 339/198 E |
| 3,657,503 | 4/1972 | Smith | 339/198 J |
| 4,079,304 | 3/1978 | Brandenburg | 339/5 RL |
| 4,156,795 | 5/1979 | Lacan | 339/22 R |
| 4,174,873 | 11/1979 | Hargett et al. | 339/10 |
| 4,288,504 | 9/1981 | Julian et al. | 339/116 R |

FOREIGN PATENT DOCUMENTS 2709604  4/1978  Fed. Rep. of Germany ... 339/207 R

*Primary Examiner*—John McQuade
*Assistant Examiner*—Gary F. Paumen
*Attorney, Agent, or Firm*—F. J. Fodale

[57] ABSTRACT

A junction box and connector arrangement for jump starting an automotive vehicle comprises a junction box of one-piece thermoplastic construction, a stud and a cap fastener. The junction box has a box-like body provided with an integrally hinged flap and an integrally hinged cover. The stud is inserted into the box-like body through an aperture in the bottom wall and retained by closing the flap. The flap also insulates the stud so it can be used as a hot connector. Cable terminals are secured to the stud by the cap fastener which serves as a connector for a conventional jumper cable clamp when jump starting is required. The open top of the body is normally closed by the hinged cover to protect the hot connector.

3 Claims, 5 Drawing Figures

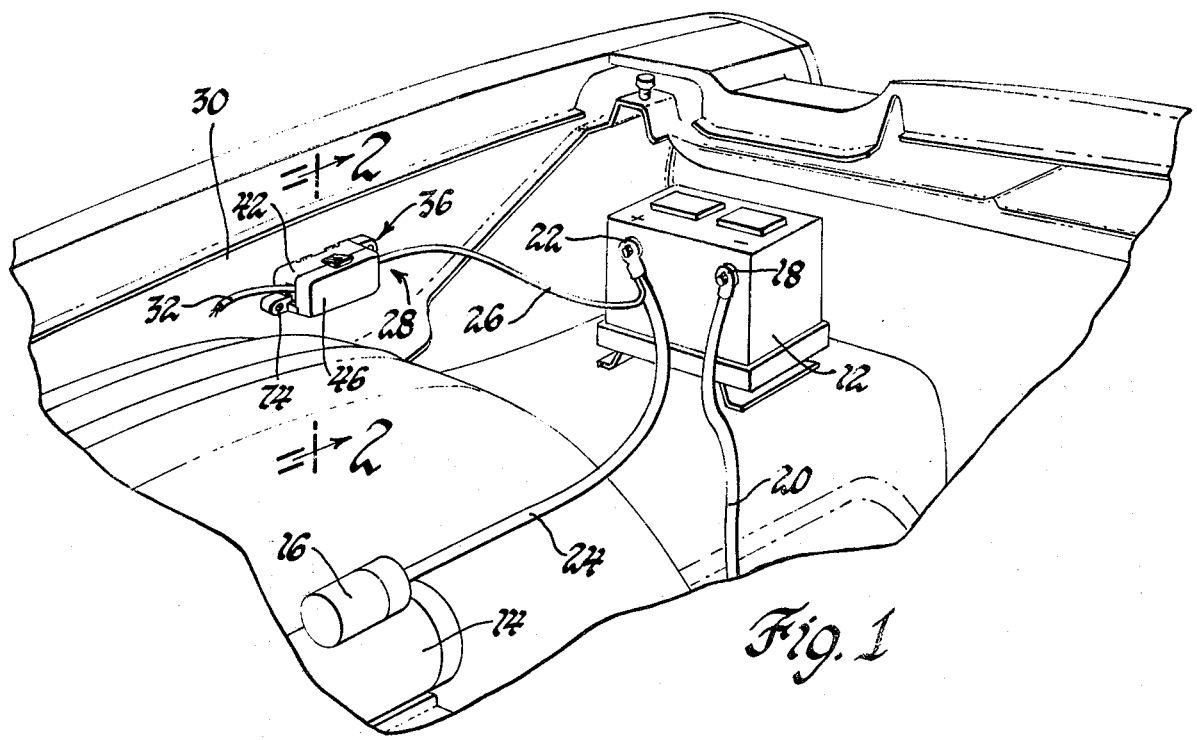
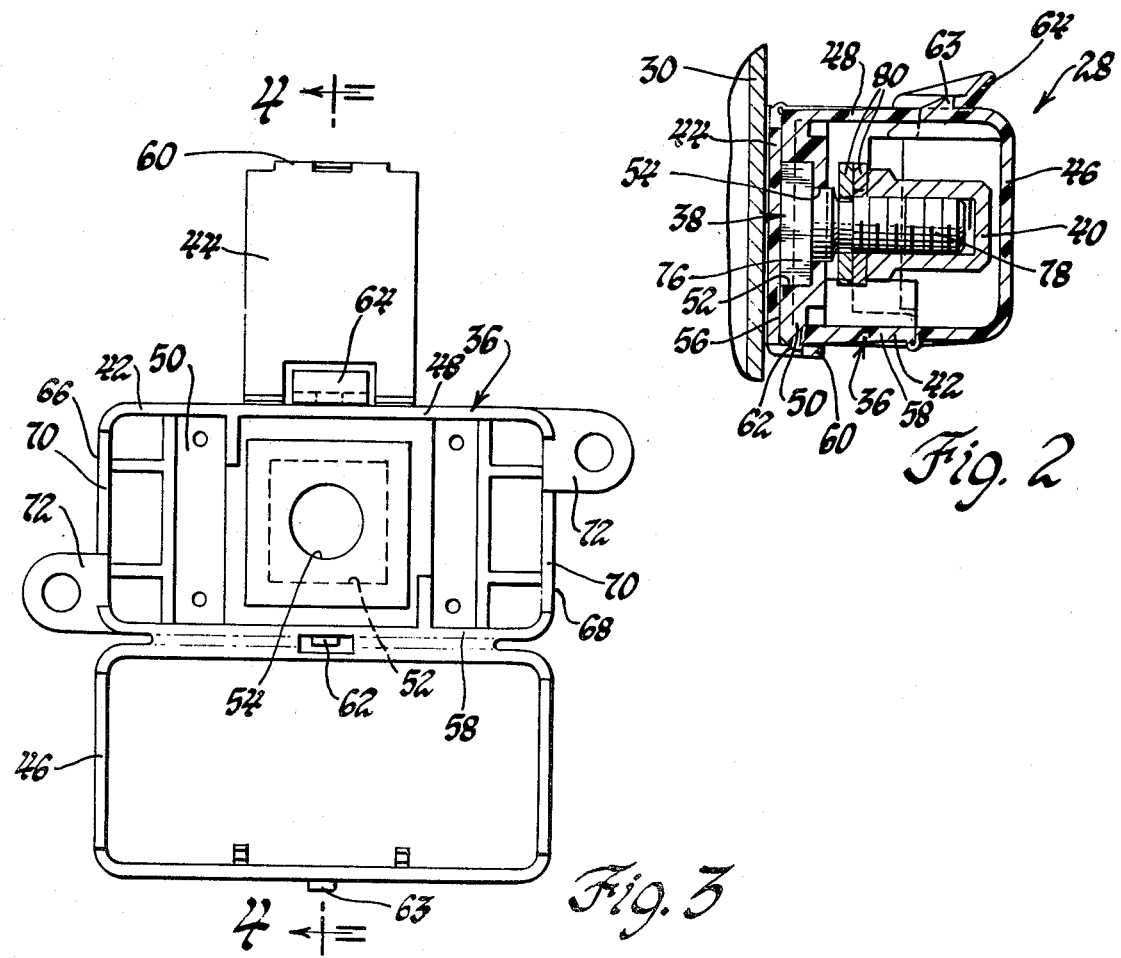

JUNCTION BOX AND CONNECTOR ARRANGEMENT

This invention relates generally to electrical connectors and, more particularly, to a junction box and connector arrangement for "jump starting" an automotive vehicle.

Vehicle storage batteries occasionally have insufficient power to crank the starting motor and start the vehicle engine. In these instances, the vehicle engine is generally "jump started" by an external storage battery and jumper cables. It is already known that it is advantageous to provide an electrical connector which is remote from the vehicle storage battery for attaching at least one of the jumper cables when jump starting the vehicle. See for instance, U.S. Pat. No. 4,079,304 granted to John D. Brandenburg on Mar. 14, 1978 and U.S. Pat. No. 4,174,873 granted to Jerry D. Hargett and Alfred C. Nash on Nov. 20, 1979.

The object of this invention is to provide a junction box and connector arrangement for jump starting an automotive vehicle which is easily and inexpensively manufactured and attached to a vehicle body at a convenient location remote from the vehicle storage battery.

A feature of the invention is that the junction box is of one-piece molded thermoplastic construction.

Another feature of the invention is that the electrical connector comprises a stud which is inserted into the junction box and retained by an integral hinged flap thereby eliminating the need for costly attachment methods for the electrical connector.

Another feature of the invention is that the hinged flap insulates the stud so that the positive side of the storage battery can be attached.

Yet another feature of the invention is that the junction box has a hinged cover to protect against short circuiting.

Still yet another feature of the invention is that the junction box and connector arrangement may also be used to connect the vehicle storage battery to electrical equipment of the vehicle.

Other objects and features of the invention will become apparent to those skilled in the art as the disclosure is made in the following detailed description of a preferred embodiment of the invention as illustrated in the accompanying sheets of drawing in which:

FIG. 1 is a perspective fragmentary view of a vehicle engine compartment having a junction box and connector arrangement according to this invention mounted therein.

FIG. 2 is a section taken substantially along the line 2—2 of FIG. 1 looking in the direction of the arrows.

FIG. 3 is a top view of the junction box used in the arrangement shown in FIGS. 1 and 2. The junction box is shown in the molded condition where the flap and cover are in the open position.

Figure 4:
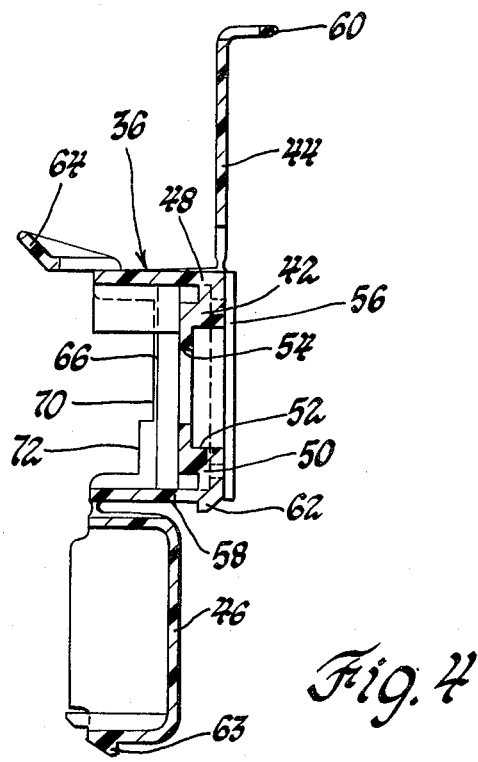
FIG. 4 is a section taken substantially along the line 4—4 of FIG. 3 looking in the direction of the arrows.

Referring now to the drawing, FIG. 1 shows a typical engine compartment of an automotive vehicle which includes a storage battery 12, an electrical starter motor 14, and a solenoid 16 for starting the engine (not shown). The battery 12 has a negative terminal 18 which is grounded in a conventional manner by a battery cable 20 which is attached to the battery terminal 18 and the vehicle body. The positive terminal 22 of the battery 12 is connected to the solenoid 16 by a second battery cable 24. In this particular instance, the battery cable 24 includes a feed lead 26 which extends from the battery 12 to a junction box and connector arrangement 28 which is fastened to a panel 30 of the vehicle body. An electric cable 32 leading out of the junction box 30 is connected to other electrical equipment of the vehicle. Alternatively, the battery cable 24 could be connected directly to the junction box and connector arrangement 28 thereby eliminating the feed lead 26. In this instance, the cable 32 would be connected to the solenoid 16 and the other electrical equipment would be fed from the connection at the solenoid 16.

This invention is directed to the junction box and connector arrangement 28 which is shown in detail in FIGS. 2, 3, 4 and 5. The arrangement 28 comprises a junction box 36, a stud 38 and a cap fastener 40.

The junction box 36 is of one-piece construction and molded from a thermoplastic material such as polypropylene. It comprises a rectangular box-like body 42 having an integrally hinged flap 44 and an integrally hinged hollow cover 46.

Figure 5:
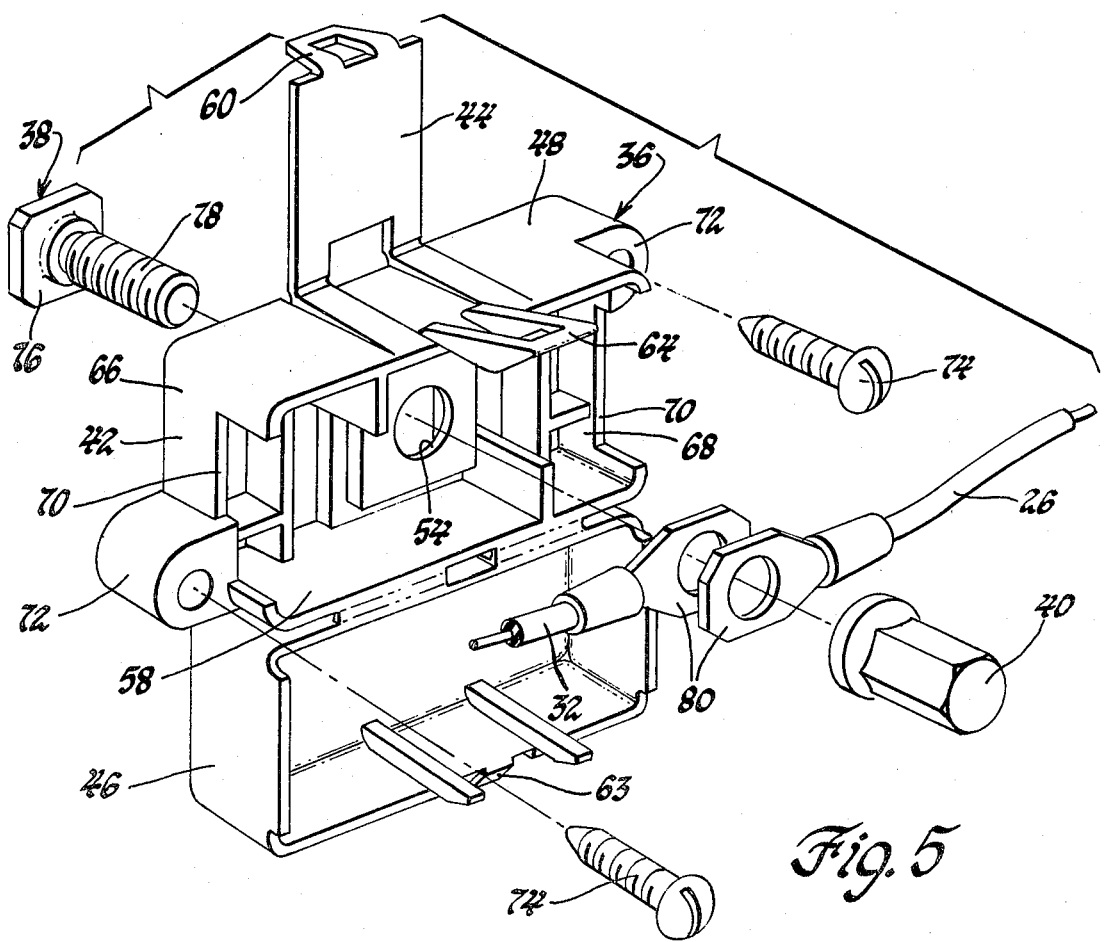
FIG. 5 is an exploded perspective view of the junction box and connector arrangement shown in FIGS. 1 and 2.

The flap 44 is integrally hinged at a bottom edge of a side wall 48 of the body 42 so that the flap 44 pivots from an open position shown in FIGS. 3, 4 and 5 to a closed position shown in FIG. 2 where it covers a portion of the bottom wall 50 of the body 42. The bottom wall 50 has an aperture extending therethrough which comprises a square recess 52 in the exterior portion of the bottom wall 50 and a round hole 54 in the interior portion of the bottom wall 50. The exterior side of the bottom wall 50 also has a shallow slot 56 which extends from the side wall 48 to the opposite side wall 58 to provide a depressed face about the square recess 52. The shallow slot 56 is shaped to receive the flap 44 in the closed position so that the flap 44 does not protrude outwardly of the exterior surface of the bottom wall 50 and interfere with mounting the junction box 36 on a flat panel. The flap 44 has a latch arm 60 which cooperates with a projecting lock nib 62 on the side wall 58 to latch the flap 44 in the closed position.

The hollow cover 46 is integrally hinged at a top edge of the side wall 58 so that the cover 46 pivots from the open position shown in FIGS. 3, 4 and 5 to the closed position shown in FIG. 2 where the cover 46 closes the open top of the box-like body 42. The cover 46 has a projecting lock nib 63 which cooperates with a latch arm 64 attached to the side wall 48 to latch the cover 46 in the closed position.

The opposite end walls 66 and 68 of the box-like body 42 each have a slot 70 for electric cables or leads to enter and exit leading into the interior of the junction box 36 when the cover 46 is closed. The end walls 66 and 68 each also have an integral boss 72 for attaching the junction box 36 to a body panel by sheet metal screws 74 or other suitable fastening means.

As stated above, the junction box and connector arrangement includes a stud 38 and a cap fastener 40. The stud 38 has a square head 76 (which matches the shape of the square recess 52) and a threaded shank 78. The stud 38 is assembled to the junction box 36 by inserting the threaded shank 78 through the hole 54 until the square head 76 rests in the square recess 52. The matching shape of the head 76 and recess 52 prevents rotation of the stud 38 with respect to the junction box 36. The hinged flap 44 is then closed and latched in the closed position to retain the stud 38 in the junction box 36. The closed flap 44 also covers the square head 76 of the stud 38 so that the stud 38 is insulated from the body panel 30 when the junction box 36 is attached. Consequently, the stud 38 can serve as a positive connection or hot lead.

After the stud 38 is secured in the junction box 36 by the flap 44, the junction box 36 can easily be attached to any flat panel in the engine compartment because the closed flap 44 does not protrude.

The auxiliary feed lead 26 and electric cable 32 are then attached.

As shown in FIG. 5, the feed lead 26 and the electric cable 32 each have a ring-type terminal 80. The ring terminals 80 are slipped onto the thread shank 78 and clamped down by the cap fastener 40 which is internally threaded. The hollow cover 46 is then closed to protect the hot leads against being short circuited.

When it is necessary to jump start the engine, the cover 46 is opened and the positive jumper cable is clamped onto the cap fastener 40 after the negative jumper cable is clamped onto the negative terminal of the vehicle storage battery 12 or to any suitable ground portion of the vehicle.

We wish it to be understood that we do not desire to be limited to the exact details of construction shown and described, for obvious modifications will occur to a person skilled in the art.

The embodiments of the invention in which an exclusion property or privilege is claimed are defined as follows:

1. A junction box and connector arrangement comprising,
a junction box of one-piece construction molded from a thermoplastic material,
said junction box comprising a box-like body having a bottom wall and a flap,
said bottom wall having an aperture extending therethrough which comprises a recess in the exterior portion of the bottom wall and a hole in the interior portion of the bottom wall,
a stud having a head disposed in said recess and a shank extending through the hole into the interior of the box-like body, and
said flap being integrally hinged to the body so that it pivots between an open position which permits insertion of the stud into the aperture and a closed position where the flap engages the head of the stud and retains the stud in assembly with the junction box.

2. A junction box and connector arrangement comprising,
a junction box of one-piece construction molded from a thermoplastic material,
said junction box comprising a box-like body having a bottom wall, and a flap,
said bottom wall having an aperture extending therethrough which comprises a recess in the exterior portion of the bottom wall and a hole in the interior portion of the bottom wall, a stud having a head disposed in said recess and a shank extending through the hole into the interior of the box-like body,
said flap being integrally hinged to the body so that it pivots between an open position which permits insertion of the stud into the aperture and a closed position where the flap covers the head of the stud to retain the stud and insulate the stud when the junction box is attached to a conductive panel, and
said junction box further comprising an integrally hinged cover which pivots to close an open end of the box-like body which is opposite the bottom wall.

3. A junction box and connector arrangement comprising,
a junction box of one-piece construction molded from a thermoplastic material,
said junction box comprising a box-like body having a side wall and a bottom wall and a flap integrally hinged to the side wall adjacent the bottom wall so that the flap pivots from an open position to a closed position covering an exterior portion of the bottom wall,
said bottom wall having a shallow slot extending from the side wall to an opposite side wall to receive the flap in a closed position and an aperture extending therethrough which comprises a recess in the exterior portion of the bottom wall which opens into the shallow slot and a hole in the interior portion of the bottom wall,
a connector comprising a stud having a head disposed in the recess and a shank extending through the hole into the interior of the box-like body,
said head and said recess being complementarily shaped so that said stud does not rotate with respect to the box-like body,
said flapp covering the head of the stud in the closed position to retain the stud and insulate the stud when the junction box is attached to a conductive panel, and
said junction box further comprising a cover integrally hinged to the opposite side wall so that the cover pivots to a position closing an open end of the box-like body which is opposite the bottom wall.

* * * * *